US012775134B2

(12) United States Patent
Hasegawa et al.

(10) Patent No.: US 12,775,134 B2
(45) Date of Patent: Oct. 27, 2026

(54) ILLUMINATION DEVICE

(71) Applicant: Japan Display Inc., Tokyo (JP)

(72) Inventors: Makoto Hasegawa, Tokyo (JP); Nobuyuki Suzuki, Tokyo (JP); Masafumi Okada, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 229 days.

(21) Appl. No.: 18/732,671

(22) Filed: Jun. 4, 2024

(65) Prior Publication Data

US 2024/0337787 A1 Oct. 10, 2024

Related U.S. Application Data

(63) Continuation of application No. PCT/JP2022/043351, filed on Nov. 24, 2022.

(30) Foreign Application Priority Data

Dec. 15, 2021 (JP) ................................ 2021-203278

(51) Int. Cl.
*F21V 8/00* (2006.01)

(52) U.S. Cl.
CPC ......... *G02B 6/0076* (2013.01); *G02B 6/0036* (2013.01); *G02B 6/0091* (2013.01)

(58) Field of Classification Search
None
See application file for complete search history.

(56) References Cited

U.S. PATENT DOCUMENTS

2012/0106195 A1* 5/2012 Chen .................... G02B 6/0076 362/613
2012/0242930 A1* 9/2012 Ryu ..................... G02B 6/0076 362/607
2014/0098563 A1* 4/2014 Kim ..................... G02B 6/0076 362/613
2016/0320545 A1* 11/2016 Hirayama ............ G02B 6/0061
2022/0003916 A1* 1/2022 Hasegawa ............ G02B 6/0036

FOREIGN PATENT DOCUMENTS

CN 203131706 U * 8/2013 ........... G02B 6/0055
JP H05-173131 A 7/1993
JP 2002-296591 A 10/2002

* cited by examiner

*Primary Examiner* — Chris H Chu
(74) *Attorney, Agent, or Firm* — XSENSUS LLP

(57) ABSTRACT

According to one embodiment, in an illumination device, a plurality of first projection portions and a plurality of second projection portions are provided in a second area of a first light guide, a thickness of the first light guide becomes less as a location thereof which is further away from a first side surface and closer to a first central portion, a plurality of third projection portions and a plurality of fourth projection portions are provided in a third area of a second light guide, and the third area has a constant thickness and a fourth area of the second light guide is a recess portion.

4 Claims, 5 Drawing Sheets

ILLUMINATION DEVICE

CROSS-REFERENCE TO RELATED APPLICATIONS

This application is a Continuation Application of PCT Application No. PCT/JP2022/043351, filed Nov. 24, 2022 and based upon and claiming the benefit of priority from Japanese Patent Application No. 2021-203278, filed Dec. 15, 2021, the entire contents of all of which are incorporated herein by reference.

FIELD

Embodiments described herein relate generally to an illumination device.

BACKGROUND

Illumination devices which can perform planner illumination have been developed. An example thereof is an illumination device in which, as a planner light source, a light source is placed on a side surface of a light guide and light is emitted from a main surface positioned at an angle to the side surface. For example, such an illumination device is used as a backlight for a liquid crystal display.

DETAILED DESCRIPTION

Figure 1:
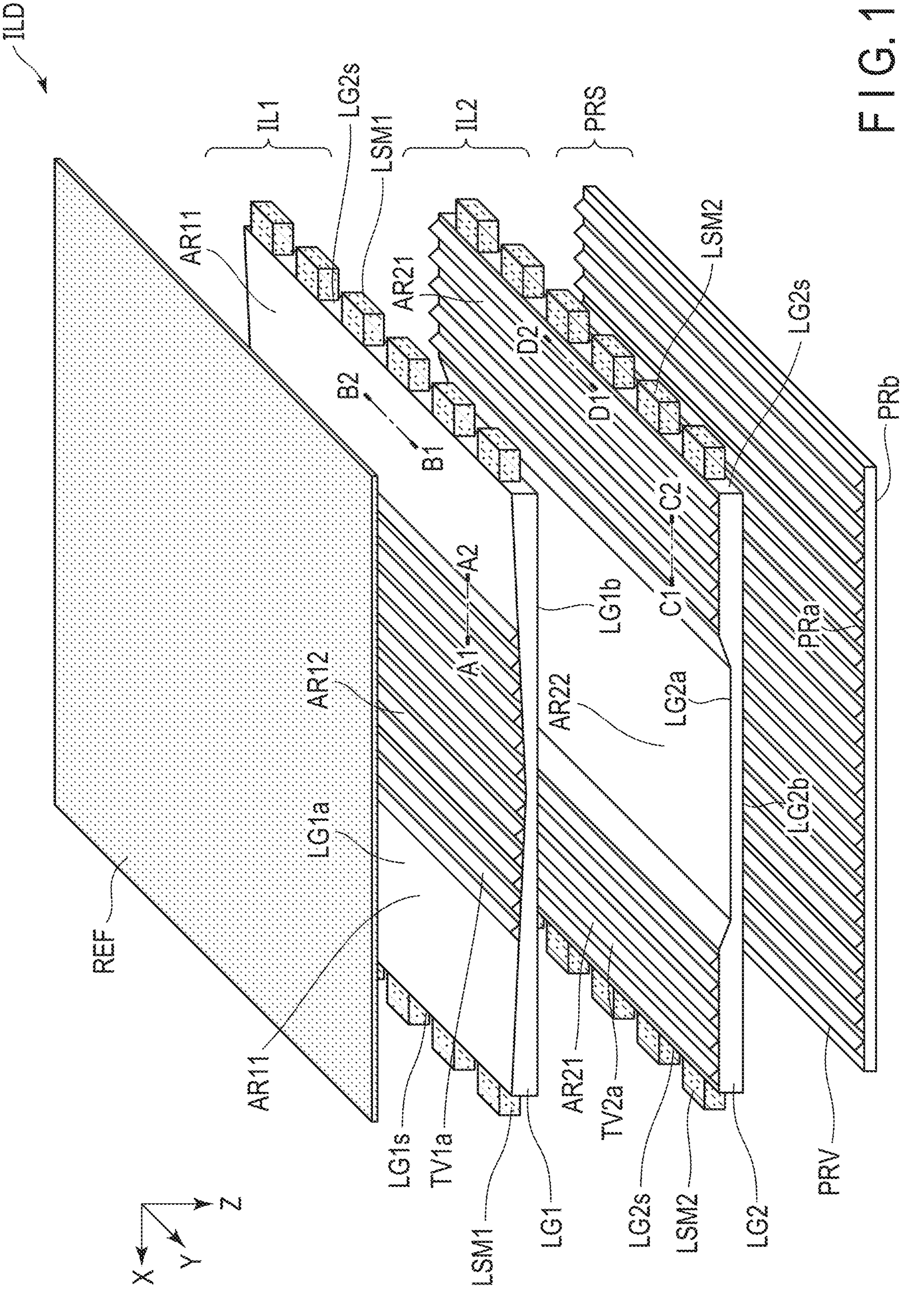
FIG. 1 is an exploded perspective view schematically showing a configuration of an illumination device of an embodiment.

In general, according to one embodiment, an illumination device comprises

- a first illumination element comprising a first light guide and a plurality of first light source elements provided on a first side surface of the first light guide;
- a second illumination element comprising a second light guide and a plurality of second light source elements provided on a second side surface of the second light guide;
- a plurality of first projection portions provided on a first main surface of the first light guide;
- a plurality of second projection portions provided on a second main surface provided on an opposite side to the first main surface;
- a plurality of third projection portions provided on a third main surface of the second light guide opposing the second main surface;
- a plurality of fourth projection portions provided on a fourth main surface on an opposite side to the third main surface, wherein
- the first light guide includes a first area which includes the first side surface and a second area including a first central portion of the first light guide,
- the second light guide includes a third area which includes the second side surface and a fourth area including a second central portion of the second light guide,
- the plurality of first projection portions and the plurality of second projection portions are provided in the second area,
- a thickness of the first light guide becomes less as a location thereof which is further away from the first side surface and closer to the first central portion,
- the plurality of third projection portions and the plurality of fourth projection portions are provided in the third area, and
- the third area has a constant thickness and the fourth area is a recess portion.

An object of this embodiment is to provide an illumination device with high luminance, which can emit light at a uniform light quantity.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

An illumination device according to one embodiment will now be described in detail with reference to the accompanying drawings.

In this embodiment, a first direction X, a second direction Y and a third direction Z are orthogonal to each other, but may intersect at an angle other than 90 degrees. The direction toward the tip of the arrow in the third direction Z is defined as up or above, and the direction opposite to the direction toward the tip of the arrow in the third direction Z is defined as down or below. The first direction X, the second direction Y and the third direction Z may as well be referred to as an X direction, a Y direction, and a Z direction, respectively.

With such expressions as "the second member above the first member" and "the second member below the first member", the second member may be in contact with the first member or may be located away from the first member. In the latter case, a third member may be interposed between the first member and the second member. On the other hand, with such expressions as "the second member on the first member" and "the second member beneath the first member", the second member is in contact with the first member.

Further, it is assumed that there is an observation position to observe the illumination device on a tip side of the arrow in the third direction Z. Here, viewing from this observation position toward the X-Y plane defined by the first direction X and the second direction Y is referred to as plan view. Viewing a cross-section of the illumination device in the X-Z plane defined by the first direction X and the third direction Z or in the Y-Z plane defined by the second direction Y and the third direction Z is referred to as cross-sectional view.

EMBODIMENT

Figure 2:
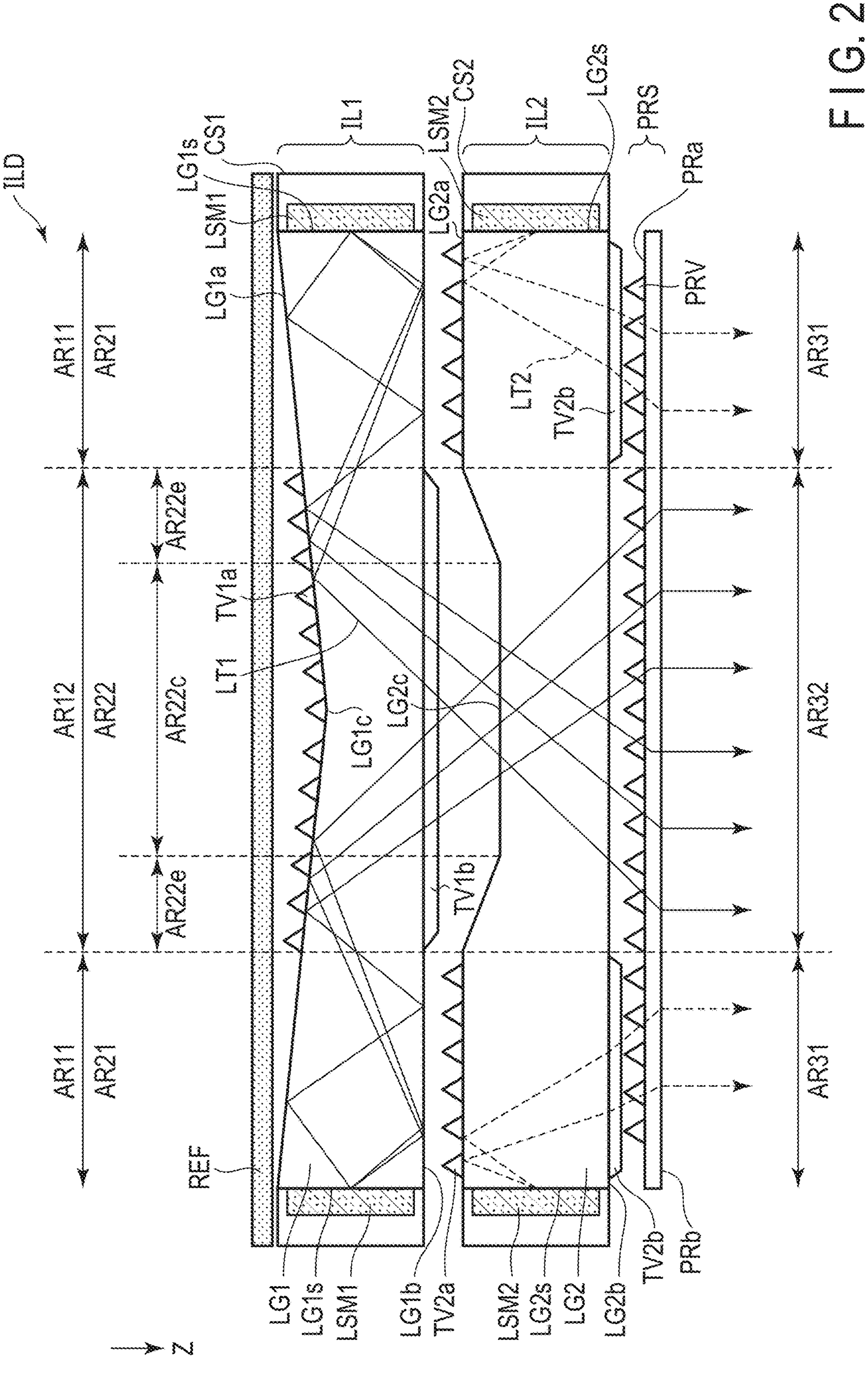
FIG. 2 is a cross-sectional view schematically showing the illumination device of the embodiment.

FIG. 1 is an exploded view showing a schematic configuration of an illumination device of this embodiment. FIG. 2 is a cross-sectional view schematically showing a configuration of the illumination device of this embodiment.

An illumination device ILD comprises a reflective sheet REF, an illumination element IL1, an illumination element IL2, and a prism sheet PRS, arranged along the third direction Z. Light output from the illumination device ILD is emitted to a lower part of the page (in the third direction Z). In order to make the explanation easily understandable, the lower part of the gage in FIG. 1 is an upper part.

The illumination device IL1 has a case CS1, a light guide LG1, and a plurality of light source elements LSM1. The plurality of light source elements LSM1 are provided adjacent to a pair of side surfaces LG1*s* of the light guide LG1. The side surfaces LG1*s* are incident portions where light from the light source elements LSM1 enters. The light guide LG1 and the plurality of light source elements LSM1 are located inside the case CS1.

The light guide LG1, which is the first light guide, comprises a main surface LG1*a*, which is a first main surface opposing the reflective sheet REF, and a main surface LG1*b*, which is a second main surface opposing the light guide LG2. The main surface LG1*b* is provided to oppose the main surface LG1*a* in the light guide LG1, on an opposite side. The light guide LG1 includes a plurality of projection portions TV1*a* on the main surface LG1*a* and a plurality of projection portions TV1*b* on the main surface LG1*b* in the central area AR12 of the light guide LG1 in an area AR12 in a central portion of the light guide LG1 along the X-axis direction. The projection portions TV1*a* and TV1*b* are not provided in an area AR11 that includes an end portion of the main surface LG1*a* and sandwiches the area AR12.

The area AR12 includes a center portion LG1*c* of the light guide LG1. The area AR11 includes a side surface LG1*s* of the light guide LG1. In this embodiment, the side surface LG1*s* may as well be referred to as a first side surface, and further, the area AR11 as a first area, and the area AR12 as a second area.

The plurality of projection portions TV1*a* are arranged in a direction parallel to the first direction X and each extends along a direction parallel to the second direction Y. The plurality of projection portions TV1*b* each extend in a direction parallel to the first direction X and are arranged along a direction parallel to the second direction Y. Each of the plurality of projection portions TV1*a* and each of the plurality of projection portions TV1*b* has a triangular prism shape.

The light guide LG1 has a thickness in the side surface LG1*s* where the light source elements LSM1 are provided, greater than a thickness in the center portion LG1*c*. The light guide LG1 has such a wedge shape that the side surface LG1*s* is thicker and the thickness becomes less as the location is away further from the side surface LG1*s* and closer to the central portion LG1*c*.

The illumination device IL2 comprises a case CS2, a light guide LG2, and a plurality of light source elements LSM2. The plurality of light source elements LSM2 are provided adjacent to a pair of side faces LG2*s* of the light guide LG2. The side surfaces LG2*s* are incident portions where light from the light source elements LSM2 enters. The light guide LG2 and the plurality of light source elements LSM2 are located inside the case CS2.

The light guide LG2, which is the second light guide, comprises a main surface LG2*a*, which is a third main surface opposing the light guide LG1, and a main surface LG2*b*, which is a fourth main surface opposing the prism sheet PRS. In the light guide LG2, the main surface LG2*b* opposes the main surface LG2*a* and is provided on an opposite side thereto. The area AR21 is an area of an end portion including the side surface LG2*s* of the light guide LG2 in the X-axis direction, and the area AR22 is an area sandwiched between the area AR21. The area AR21 includes a plurality of projection portions TV2*a* on the main surface LG2*a* and a plurality of projection portions TV2*b* on the main surface LG2*b*. In the central area AR22 of the light guide LG2, the projection portions TV2*a* and TV2*b* are not provided. In this embodiment, the side surface LG2*s* may as well be referred to as the second side surface, and further the area AR21 as the third area, and the area AR22 as the fourth area.

The plurality of projection portions TV2*a* are arranged in a direction parallel to the first direction X and each extends along a direction parallel to the second direction Y. The plurality of projection portions TV2*b* each extend in a direction parallel to the first direction X and are arranged along a direction parallel to the second direction Y. Each of the plurality of projection portions TV2*a* and each of the plurality of projection portions TV2*b* has a triangular prism shape.

In the light guide LG2, the thickness of the area AR21 where the projection portions TV2*a* are provided is greater than that of the area AR22 where the projection portions TV2*a* are not provided. The thickness of the area AR21 is constant and can be said as a flat area. The area AR22 includes the central portion LG2*c* of the light guide LG2 and constitutes a recess portion of the light guide LG2. In the area AR22, the central area AR22*c* including the central portion LG2*c* has a constant thickness, and in the area AR22*e* of the end portion, the thickness increases as the location approaches the area AR21. The thickness of the area AR22*c* is greater than that of the area AR21. The area AR22*e* is located between the areas AR22*c* and AR21.

The central portion LG2*c* overlaps the central portion LG1*c* in plan view. In this embodiment, the central portions LG1*c* and LG2*c* may as well be referred to as a first central portion and a second central portion, respectively. The central area AR22*c* and the end portion area AR22*e* may as well be referred to as a fifth area and a sixth area, respectively.

The prism sheet PRS comprises a main surface PRa opposing the light guide LG2 and a main surface PRb opposing the main surface PRa, provided on an opposite side thereto. The main surface PRa is provided with a plurality of projection portions PRV in its entire surface.

The plurality of projection portions PRV are arranged in a direction parallel to the first direction X and each extend along a direction parallel to the second direction Y. Each of the plurality of projection portions PRV has a triangular prism shape and its cross-sectional shape is triangular.

Light LT1 emitted from the light source elements LSM1 enters the side surface LG1*s* of the light guide LG1. The entering light LT1 propagates inside the light guide LG1 while repeating total reflection therein. The reflection angle of the light LT1 is changed by the projection portions TV1*a* and TV1*b* provided in the area AR12. The light LT1, whose reflection angle is changed, is emitted from the main surface LG1*b* toward the light guide LG2.

The light LT1 entering the main surface LG2*a* of the light guide LG2 is emitted from the main surface LG2*b* toward the prism sheet PRS through the area AR22 that does not includes the projection portion TV2*a*. The reflection angle of the light LT1 entering the main surface PRa of the prism sheet PRS is further changed by the projection portions PRV. The light LT1 whose reflection angle is changed becomes parallel to the third direction Z and is emitted from the main surface PRb.

Light LT2 emitted from the light source element LSM2 enters the side surface LG2*s* of the light guide LG2. The reflection angle of the incident light LT2 is changed by the projection portions TV2*a* and TV2*b* provided in the area AR21. The light LT2 whose reflection angle is changed is emitted from the main surface LG2*b* toward the prism sheet PRS. The reflection angle of the light LT2 entering the main surface PRa of the prism sheet PRS is further changed by the projection portions PRV. The light LT2 whose reflection angle is changed becomes parallel to the third direction Z and is emitted from the main surface PRb.

Of the area of the prism sheet PRS, the area corresponding to the area AR12 where the projection portions TV1*a* and TV1*b* are provided is referred to as an area AR32. The light LT1 is emitted from the area AR32 and the light LT2 is emitted from the area AR31.

In the illumination device ILD of this embodiment, the light source elements LSM1 and LSM2 are backlights of the so-called side light structure (which may as well be referred to as an edge light structure), in which the light source elements LSM1 and LSM2 are provided respectively on the side surfaces of the light guides LG1 and LG2. With the side light structure, the thickness can be reduced as compared to the case of the backlight with a directly below structure (direct-below light type). However, backlights of the side-light structure have a light output efficiency lower than that of the backlights of the direct-below structure, and therefore it is difficult to obtain illumination light of high luminance.

Even with a backlight with a sidelight structure, if the thickness of the light guide is, for example, about 1.4 mm, the number of times light from the light source elements propagates inside the light guide increases, and the emitted light increases. Thus, the luminance of the illumination light is enhanced. On the other hand, if the thickness of the light guide is, for example, 3.0 mm, the number of times light from the light source elements propagates inside the light guide decreases to fail to satisfy the light emission angle, and thus light not emitted increases. Thus, the light output efficiency is decreased and the luminance of illumination light becomes low.

In the illumination device ILD of this embodiment, the thickness of the light guides LG1 and LG2 is, for example, 3.0 mm. Even if the light guides LG1 and LG2 have such a great thickness, the illumination device ILD of this embodiment can achieve illumination light with high luminance and uniform light quantity. That is, with the light guide LG1 and the projection portions TV1*a* provided thereon, it is possible to obtain the light LT1 emitted from the area near the center of the irradiating surface. With the light guide LG2 and the projection portions TV2*a* provided therein, it is possible to obtain the light LT2 emitted from the area near the end portion of the irradiation surface. The illumination light synthesized from light LT1 and LT2 becomes a light with high luminance and uniform light quantity.

Figure 3A:
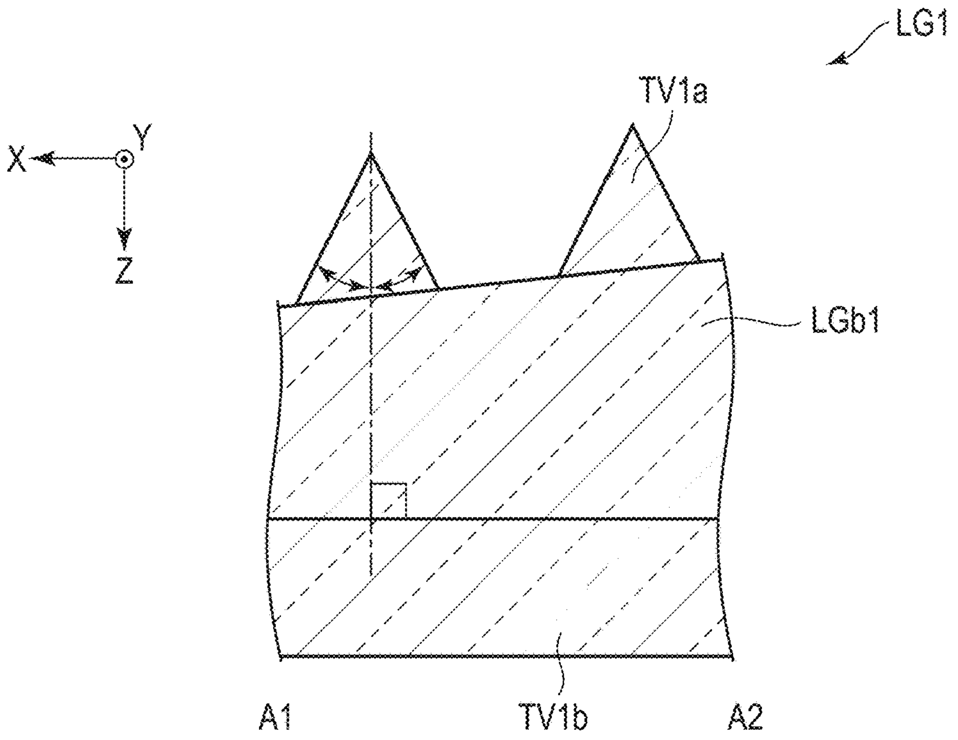
FIG. 3A is a cross-sectional view showing the illumination device taken along line A1-A2 in FIG. 1.
Figure 3B:
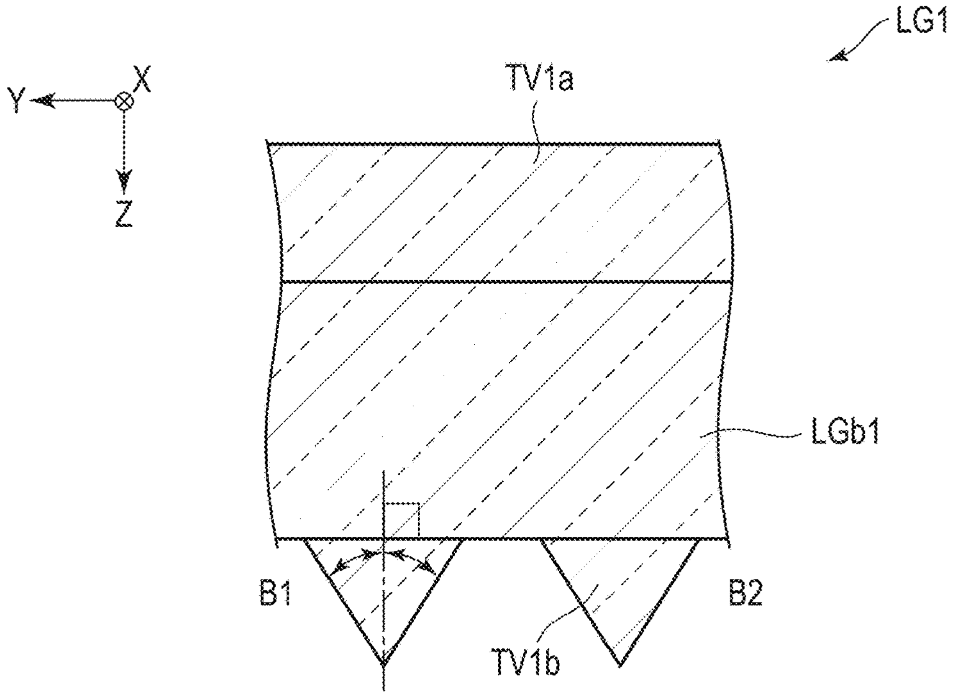
FIG. 3B is a cross-sectional view showing the illumination device taken along line B1-B2 in FIG. 1.
Figure 4A:
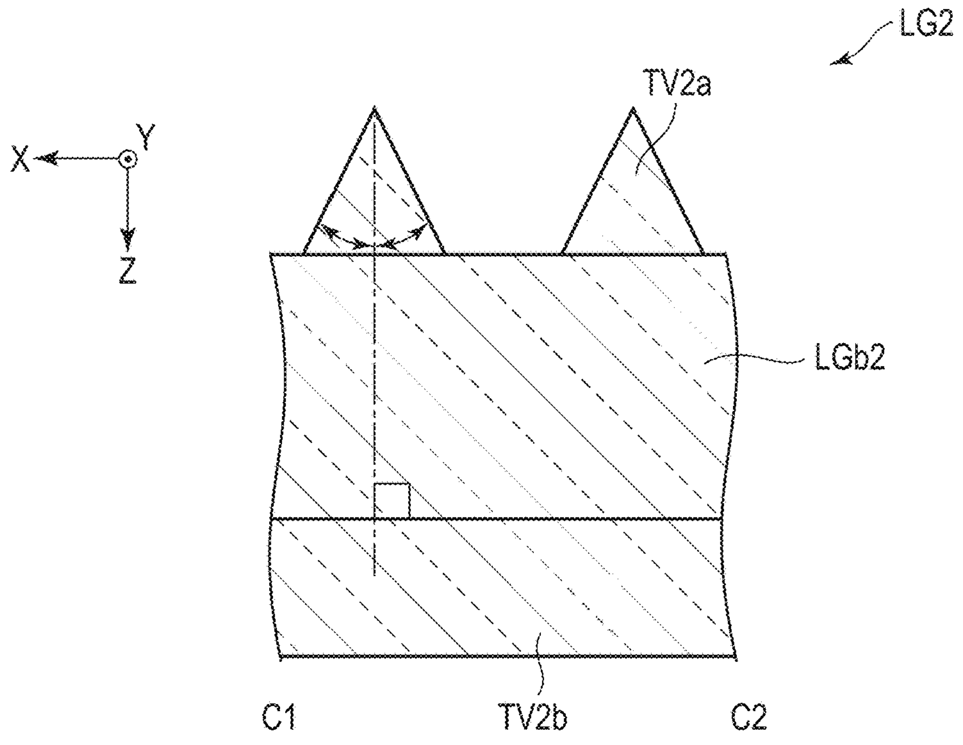
FIG. 4A is a cross-sectional view showing the illumination device taken along line C1-C2 in FIG. 1.
Figure 4B:
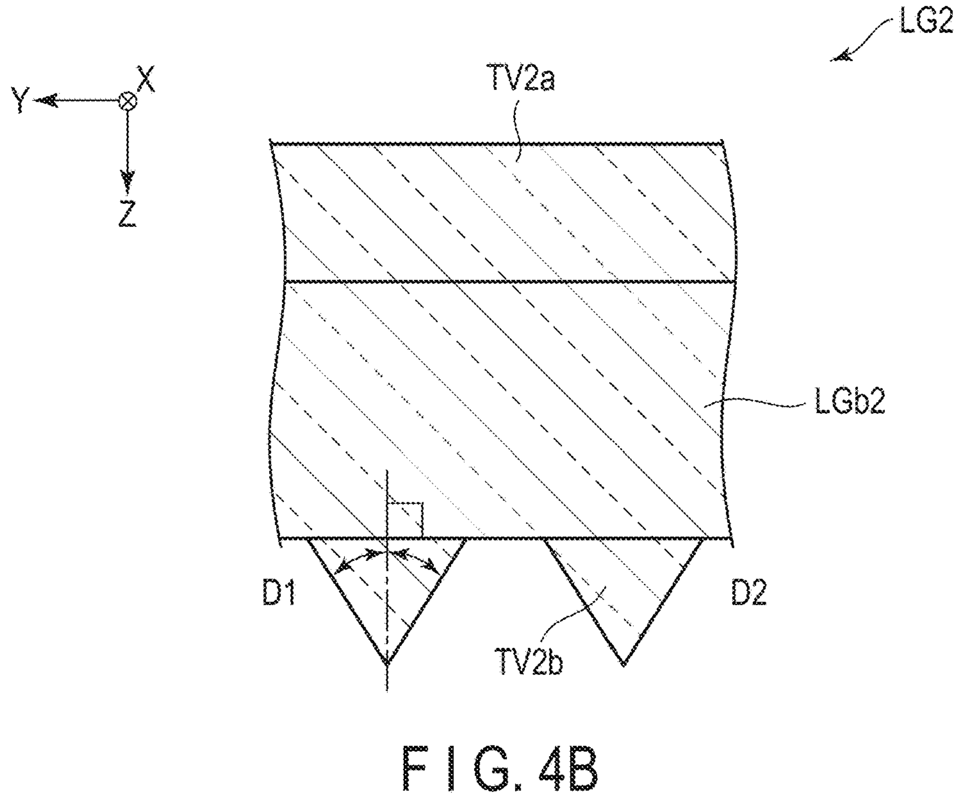
FIG. 4B is a cross-sectional view showing the illumination device taken along line D1-D2 in FIG. 1.

FIG. 3A is a cross-sectional view of the illumination device taken along line A1-A2 in FIG. 1. FIG. 3B is a cross-sectional view of the illumination device taken along line B1-B2 of FIG. 1. FIG. 4A is a cross-sectional view of the illumination device taken along line C1-C2 in FIG. 1. FIG. 4B is a cross-sectional view of the illumination device taken along line D1-D2 in FIG. 1.

As shown in FIG. 3A, the projection portions TV1*a* each have a triangular cross-sectional shape in the X-Z plane. Here, let us assume an imaginary line passing through a vertex of the triangle and parallel to the third direction Z. The two sides forming the vertex angle of the triangle are equal in distance from the imaginary line. The angle between each of the two sides forming the vertex angle of the triangle and the imaginary line is half of the vertex angle. The cross-sectional shape of the projection portions TV1*a* is an isosceles triangle.

As shown in FIG. 3B, the projection portion TV1*b* has a triangular cross-sectional shape in the Y-Z plane. Here, let us assume an imaginary line passing through a vertex of the triangle and parallel to the third direction Z. The two sides forming the vertex angle of the triangle are equal in distance from the imaginary line. The angle formed between each of the two sides forming the vertex angle of the triangle and the imaginary line is a half of the vertex angle. The cross-sectional shape of the projection portions TV1*b* can be said as an isosceles triangle.

As shown in FIG. 4A, the projection portions TV2*a* each have a triangular cross-sectional shape in the X-Z plane. Let us assume an imaginary line passing through a vertex of the triangle and parallel to the third direction Z. The two sides forming the vertex angle of the triangle are equal in distance from the imaginary line. The angle formed between each of the two sides forming the vertex angle of the triangle and the imaginary line is a half of the vertex angle. The cross-sectional shape of the projection portions TV2*a* can be said as an isosceles triangle.

As shown in FIG. 4B, the projection portions TV2*b* each have a triangular cross-sectional shape in the Y-Z plane. Here, let us assume an imaginary line passing through a vertex of the triangle and parallel to the third direction Z. The two sides forming the vertex angles of the triangle are equal in distance from the imaginary line. The angle formed between each of the two sides forming the vertex angle of the triangle and the imaginary line is a half of the vertex angle. The cross-sectional shape of the projection portion TV2*b* can be said as an isosceles triangle.

Figure 5:
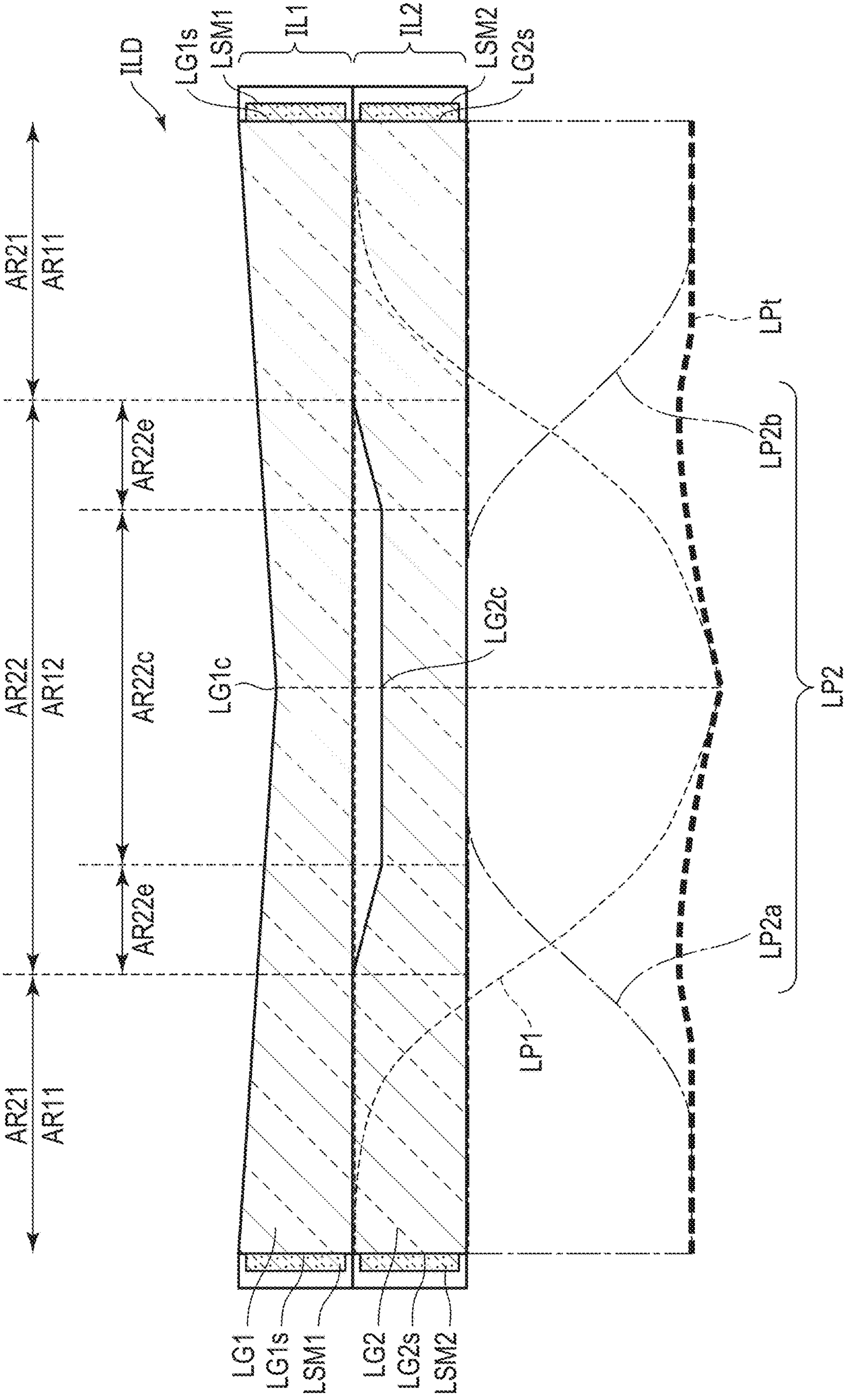
FIG. 5 is a diagram illustrating the quantity of light emitted from the illumination device.

FIG. 5 is a diagram illustrating the quantity of light emitted from the illumination device, in which the projection portions of the light guide LG1 and the light guide LG2 are omitted. A light quantity LP1 of the emission light emitted via the light guide LG1 is maximum at the locations corresponding to the center portions LG1*c* and LG2*c*, and decreases as the location approaches the side surface LG1*s* of the light guide LG1. This is because the light guide LG1 comprises the projection portions TV1*a* and TV1*b* in the area AR12 adjacent to the central portion LG1*c*. Note here that the locations corresponding to the central portions LG1*c* and LG2*c* may as well be referred to as the central portion of the irradiating surface.

On the other hand, a light quantity LP2 of the emission light emitted via the light guide LG2 is maximum at the side surface LG2*s* of the light guide LG2 and decreases as the location approaches the center portion. In the area corresponding to the area AR22*c*, the light quantity LP2 is 0 (zero). In other words, the light quantity LP2 is a resultant quantity of a composite of the light quantity LP2*a*, which is maximum on one side surface LG2*s* and decreases as the location approaches the center portion, and the light quantity LP2*b*, which is maximum on another side surface LG2*s* opposing that one side surface LG2*s* and decreases as the location approaches the center portion. The reason why the light quantity LP2 has such a profile is that the light guide LG2 includes the projection portions TV1*a* and TV1*b* in the area AR21 and the projection portions TV2*a* and TV2*b* are not provided in the area AR22 in the center.

A light quantity LPt of the light emitted from the illumination device ILD is the sum of the light quantities LP1 and LP2. As shown in FIG. 5, the light quantity LPt is uniform with respect to the irradiating surface of the illumination device ILD.

The illumination device ILD of this embodiment has such a configuration that the light guide LG1, which emits light from the center area of the light guide and the light guide LG2, which emits light from the end portions of the light guide overlap each other. With this configuration, it is possible to increase the quantity of emission light as compared to the case where there is only one light guide.

In the embodiment, the illumination device ILD can be used as a backlight. Examples of backlights include collimated backlights. Note here that the illumination device ILD of this embodiment is not limited to a backlight. As other examples, the illumination device ILD of this embodiment can be adopted as an illumination light.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device comprising:

a first illumination element comprising a first light guide and a plurality of first light source elements provided on a first side surface of the first light guide;

a second illumination element comprising a second light guide and a plurality of second light source elements provided on a second side surface of the second light guide;

a plurality of first projection portions provided on a first main surface of the first light guide;

a plurality of second projection portions provided on a second main surface provided on an opposite side to the first main surface;

a plurality of third projection portions provided on a third main surface of the second light guide opposing the second main surface;

a plurality of fourth projection portions provided on a fourth main surface on an opposite side to the third main surface, wherein the first light guide includes a first area which includes the first side surface and a second area including a first central portion of the first light guide, the second light guide includes a third area which includes the second side surface and a fourth area including a second central portion of the second light guide, the plurality of first projection portions and the plurality of second projection portions are provided in the second area, a thickness of the first light guide becomes less as a location thereof which is further away from the first side surface and closer to the first central portion, the plurality of third projection portions and the plurality of fourth projection portions are provided in the third area, and the third area has a constant thickness and the fourth area is a recess portion.

2. The illumination device according to claim 1, wherein a cross-sectional shape of each of the plurality of first projection portions, each of the plurality of second projection portions, each of the plurality of third projection portions, and each of the plurality of fourth projection portions is a triangle, and in the triangle, two sides forming a vertex angle are equal in distance from an imaginary line passing through the vertex.

3. The illumination device according to claim 2, wherein an angle formed by each of the two sides forming a vertex angle and the imaginary line is half of the vertex angle.

4. The illumination device according to claim 1, wherein the fourth area includes a fifth area including the second central portion and a sixth area between the fifth area and the third area, a thickness of the fifth area is less than that of the third area, and a thickness of the sixth area increases as a location approaches the third area.

* * * * *